(12) United States Patent  (10) Patent No.: US 9,667,433 B2
 Wu  (45) Date of Patent: May 30, 2017

(54) METHOD, DEVICE AND MOBILE BROADCAST BUSINESS MANAGEMENT SYSTEM FOR TRANSMITTING DATA INFORMATION

(75) Inventor: Shaoduo Wu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 874 days.

(21) Appl. No.: 13/699,111

(22) PCT Filed: Feb. 10, 2011

(86) PCT No.: PCT/CN2011/070914
 § 371 (c)(1),
 (2), (4) Date: Nov. 20, 2012

(87) PCT Pub. No.: WO2011/143955
 PCT Pub. Date: Nov. 24, 2011

(65) Prior Publication Data
 US 2013/0067033 A1  Mar. 14, 2013

(30) Foreign Application Priority Data

May 21, 2010 (CN) .......................... 2010 1 0181752

(51) Int. Cl.
 *G06F 13/00* (2006.01)
 *H04L 12/18* (2006.01)
 (Continued)
(52) U.S. Cl.
 CPC .......... *H04L 12/189* (2013.01); *H04L 65/607* (2013.01); *H04W 4/06* (2013.01)
(58) Field of Classification Search
 CPC ..... H04L 12/189; H04L 65/607; H04L 65/80; H04L 67/02; H04L 1/1812; H04L 47/14;
 (Continued)

(56) References Cited

U.S. PATENT DOCUMENTS 5,535,127 A * 7/1996 Uno et al. ..................... 705/406
7,596,567 B2 * 9/2009 Lai et al.
 (Continued)

FOREIGN PATENT DOCUMENTS

CN  1612542 A  5/2005
CN  101083518 A  12/2007
 (Continued)

OTHER PUBLICATIONS

Multimedia Broadcast/Multicast Service (MBMS); Protocols and codecs (3GPP TS 26.346 version 9.2.0 Release 9) Apr. 2010.*
 (Continued)

*Primary Examiner* — Robert B Harrell
(74) *Attorney, Agent, or Firm* — Oppedahl Patent Law Firm LLC

(57) ABSTRACT

The disclosure provides a method, a device and a Mobile Broadcast Business Management System (MBBMS) for transmitting data information, wherein the method includes: a source platform sends a synchronous data stream to a data buffer, and determines whether the synchronous data stream is sent to the data buffer successfully; if the synchronous data stream is sent to the data buffer successfully, the data buffer sends the synchronous data stream to a target platform; and if the synchronous data stream is sent to the data buffer unsuccessfully, the source platform sends the synchronous data stream to a data memory for storing. By means of the method, device and MBBMS for transmitting data information, after the data buffer sends the synchronous data stream unsuccessfully, the data buffer regularly extracts the synchronous data stream from the data memory and sends the synchronous data stream extracted to the target platform until the synchronous data stream extracted is sent successfully; the number of times of synchronous data transmission and the amount of transmitted synchronous data are reduced and a large amount of network resources are thus saved.

52 Claims, 10 Drawing Sheets

(51) Int. Cl.
*H04L 29/06* (2006.01)
*H04W 4/06* (2009.01)

(58) Field of Classification Search
CPC ....... H04L 1/0065; H04L 1/08; H04L 1/1819;
H04L 29/08981; H04L 29/06; H04L
29/0809; H04L 29/08072; H04W 4/06;
G06F 3/0488; G06F 3/04883; G06F
1/1626; G06F 3/017; G06F 3/0486; G06F
2203/04803; G06F 3/04817; G06F
3/0484; G06F 3/0485; G06F 3/04886;
G06F 17/30905; G06F 2203/04804; G06F
3/0481; G06F 17/211; G06F 17/2247;
G06F 1/1637; G06F 1/1656; G06F
1/1662; G06F 1/184; G06F 2203/0381;
G06F 3/005; G06F 3/013; G06F 3/0202;
G06F 3/033; G06F 3/03545; G06F 3/038;
G06F 3/041; G06F 3/0416; G06F 3/0482;
G06F 3/04842; G06F 3/04845; G06F
3/04; G06Q 30/02; H04N 21/44004;
H04N 21/6131
USPC ........................................................ 709/217
See application file for complete search history.

(56) References Cited

U.S. PATENT DOCUMENTS

| 2005/0207415 | A1* | 9/2005 | Curcio et al. ................. 370/390 |
| 2007/0113138 | A1* | 5/2007 | Kwon et al. .................. 714/748 |
| 2007/0192812 | A1* | 8/2007 | Pickens et al. ................ 725/94 |
| 2008/0231750 | A1* | 9/2008 | Suzuki .......................... 348/563 |
| 2009/0199061 | A1 | 8/2009 | Lee |
| 2010/0011274 | A1* | 1/2010 | Stockhammer et al. ..... 714/752 |
| 2011/0051648 | A1* | 3/2011 | Kato ............................ 370/312 |

FOREIGN PATENT DOCUMENTS

| CN | 101170523 A | 4/2008 |
| CN | 101499891 A | 8/2009 |
| CN | 101860797 A | 10/2010 |
| EP | 1855411 A2 | 11/2007 |
| EP | 2086152 A2 | 8/2009 |
| JP | 2009105662 A | 5/2009 |
| RU | 2235437 C2 | 8/2004 |
| RU | 2284667 C2 | 9/2006 |
| RU | 2378769 C2 | 1/2010 |
| RU | 2378770 C2 | 1/2010 |
| WO | 2009010434 A2 | 1/2009 |

OTHER PUBLICATIONS

International Search Report in international application No. PCT/CN2011/070914, mailed on Jun. 2, 2011.

English Translation of the Written Opinion of the International Search Authority in international application No. PCT/CN2011/070914, mailed on Jun. 2, 2011.

Bakhuizen M et al: "Mobile broadcast/multicast in mobile networks", Internet Citation,2005, XP002431868, Retrieved from the Internet:URL:http://www.ericsson.com/ericsson/corpi nfo/publicati ons/revi ew/2005_01/files/2005015.pdf [retrieved on May 2, 2007],mailed on May 2, 2007.

Supplementary European Search Report in European application No. 11782872.3, mailed on Nov. 23, 2016.

* cited by examiner

METHOD, DEVICE AND MOBILE BROADCAST BUSINESS MANAGEMENT SYSTEM FOR TRANSMITTING DATA INFORMATION

TECHNICAL FIELD

The disclosure relates to the field of communications, and in particular to a method, a device and a system for transmitting data information.

BACKGROUND

In recent years, with the rapid development of communication technology, a 3rd Generation (3G) network age (including a telecom network, a broadcasting and television network and an Internet network) has gradually come, followed with more and more extensive mobile commerce application; now enterprises generally realize information interaction with users through mobile Internet. Mobile TV, mobile download, mobile payment and other value-added services have been entering into people's life. The arrival of the 3G network age makes the service data volume transmitted between platforms very large, therefore it is a considerable problem to guarantee effective business data transmission between the platforms.

An MBBMS, as a kind of broadcasting and television network, can provide downlink transmission of multimedia contents by using broadcasting networks provided by broadcasting and television operators, can accomplish authentication, authorization and management of users by using authentication management systems of China mobile communication network systems and user management systems of broadcasting and television operators, and can further realize a related interactive function by using two-way channels of mobile network systems.

In the MBBMS, referring to FIG. 1, with the increase of service data, the amount of synchronous data transmitted between a broadcasting and television platform and a mobile service platform continues increasing. Therefore, one or more batch of synchronous data are often caused to be transmitted unsuccessfully between two platforms because the system is busy, as a result, the unsuccessfully transmitted synchronous data need to be transmitted once again or many times, which wastes a large amount of network resources.

SUMMARY

In view of the problem above, the main purpose of the disclosure is to provide a method, a device and a system for transmitting data information to reduce the amount of transmitted data information and the number of times of data information transmission, so as to save network resources.

The disclosure provides a method for transmitting data information, which includes the following steps:

sending, by a source platform, a synchronous data stream to a data buffer, and determining, by the source platform, whether the synchronous data stream is sent to the data buffer successfully;

if the synchronous data stream is sent to the data buffer successfully, sending, by the data buffer, the synchronous data stream to a target platform; and if the synchronous data stream is sent to the data buffer unsuccessfully, sending, by the source platform, the synchronous data stream to a data memory for storing.

Preferably, the step of sending, by the data buffer, the synchronous data stream to a target platform if the synchronous data stream is sent to the data buffer successfully may include:

sending, by the data buffer, the synchronous data stream to the target platform, and determining whether the synchronous data stream is sent successfully;

if the synchronous data stream is sent unsuccessfully, sending, by the data buffer, the synchronous data stream to the data memory for storing, then extracting the synchronous data stream from the data memory regularly according to a preset timing period parameter, and sending the synchronous data stream extracted regularly to the target platform until the data buffer sends the synchronous data stream extracted regularly to the target platform successfully; and deleting, by the data memory, the synchronous data stream extracted regularly which has been sent successfully.

Preferably, after the step of sending, by the source platform, the synchronous data stream to a data memory for storing if the synchronous data stream is sent to the data buffer unsuccessfully, the method may further include:

extracting, by the data buffer, the synchronous data stream from the data memory regularly according to a preset timing period parameter;

sending, by the data buffer, the synchronous data stream extracted regularly to the target platform until the synchronous data stream extracted regularly is sent to the target platform successfully; and deleting, by the data memory, the synchronous data stream extracted regularly which has been sent successfully.

Preferably, after the step of sending, by the source platform, the synchronous data stream to a data memory for storing if the synchronous data stream is sent to the data buffer unsuccessfully, the method may further include:

sending, by the source platform, a serial number corresponding to the synchronous data stream to be re-sent to the data buffer;

extracting, by the data buffer, the synchronous data stream to be re-sent from the data memory according to the serial number, and sending the synchronous data stream to be re-sent to the target platform; and deleting, by the data memory, the synchronous data stream to be re-sent which has been sent successfully.

Preferably, the synchronous data stream may contain: service data to be synchronized, a serial number corresponding to the service data to be synchronized, and an effective flag, wherein the effective flag is an instant effective flag or a timing effective flag.

Preferably, after the target platform receives the synchronous data stream, the method may further include:

determining whether the synchronous data stream contains an instant effective flag or a timing effective flag;

if the synchronous data stream contains a timing effective flag, storing the service data to be synchronized and the serial number contained in the synchronous data stream in a temporary data module;

extracting the serial number in the temporary data module and service data to be updated in a formal data module, and storing the serial number and the service data to be updated in a historical data module;

extracting the service data to be synchronized in the temporary data module, and updating the service data to be updated in the formal data module with the service data to be synchronized; and deleting the service data to be synchronized and the serial number in the temporary data module;

and if the synchronous data stream contains an instant effective flag, extracting the serial number in the synchronous data stream received and the service data to be updated in the formal data module, and storing the serial number together with the service data to be updated in the historical data module; and updating the service data to be updated in the formal data module with the service data to be synchronized in the synchronous data stream received.

Preferably, the method may further include:

determining, by the source platform, whether a synchronous data stream to be reversed is sent to the data buffer successfully;

if the synchronous data stream to be reversed is sent to the data buffer successfully, sending, by the source platform, a reverse flag and a serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed;

and if the synchronous data stream to be reversed is sent to the data buffer unsuccessfully, sending, by the source platform, the reverse flag and the serial number corresponding to the synchronous data stream to be reversed to the data memory; and searching for, by the data memory, the synchronous data stream to be reversed corresponding to the serial number according to the reverse flag, and reversing, by the data buffer, the synchronous data stream to be reversed.

Preferably, the step of reversing, by the data memory, the synchronous data stream to be reversed may include:

deleting, by the data memory, the synchronous data stream to be reversed, and determining, by the data memory, whether the synchronous data stream to be reversed is deleted successfully;

if the synchronous data stream to be reversed is deleted unsuccessfully, sending, by the source platform, the reverse flag and the serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed.

The step of searching for, by the target platform, the synchronous data stream to be reversed corresponding to the serial number according to the reverse flag, and reversing, by the target platform, the synchronous data stream to be reversed may include:

determining, according to the reverse flag, whether there is a synchronous data stream to be reversed corresponding to the serial number in the temporary data module;

if there is no synchronous data stream to be reversed, extracting the service data stored together with the serial number in the historical data module according to the serial number;

updating the service data to be synchronized to be reversed in the formal data module with the service data extracted; and if there is a synchronous data stream to be reversed, deleting the synchronous data stream to be reversed in the temporary data module.

Preferably, the source platform may be a broadcasting and television platform, and the target platform may be a mobile service platform.

The disclosure further provides a system for transmitting data information, which includes: a source platform, a target platform, a data memory and a data buffer; wherein the source platform is configured to send a synchronous data stream to the data buffer and determine whether the synchronous data stream is sent to the data buffer successfully, and if the synchronous data stream is sent to the data buffer unsuccessfully, send the synchronous data stream sent unsuccessfully to the data memory;

the data buffer is configured to, when receiving the synchronous data stream from the source platform successfully, send the synchronous data stream received successfully to the target platform; and the data memory is configured to store the synchronous data stream which is sent unsuccessfully from the source platform to the data buffer.

Preferably, the data buffer may be further configured to send the synchronous data stream to the target platform, and determine whether the synchronous data stream is sent to the target platform successfully; if the synchronous data stream is sent to the target platform unsuccessfully, send the synchronous data stream to the data memory, extract the synchronous data stream from the data memory regularly according to a preset timing period parameter, and send the synchronous data stream extracted regularly to the target platform; and the data memory may be further configured to store the synchronous data stream sent by the data buffer, and delete the synchronous data stream extracted regularly which has been sent successfully.

Preferably, the data buffer may be further configured to, after the source platform sends the synchronous data stream to the data buffer unsuccessfully, extract the synchronous data stream from the data memory regularly according to the preset timing period parameter; and send the synchronous data stream extracted regularly to the target platform until the synchronous data stream extracted regularly is sent to the target platform successfully; and the data memory may be further configured to, after the source platform sends the synchronous data stream to the data buffer unsuccessfully, store the synchronous data stream sent by the source platform, and delete the synchronous data stream extracted regularly which has been sent successfully.

Preferably, the source platform may be further configured to send a serial number corresponding to a synchronous data stream to be re-sent to the data buffer;

the data buffer may be further configured to extract the synchronous data stream to be re-sent from the data memory according to the serial number, and send the synchronous data stream to be re-sent to the target platform; and the data memory may be further configured to delete the synchronous data stream to be re-sent which has been sent successfully.

Preferably, the synchronous data stream may contain: service data to be synchronized, a serial number corresponding to the service data to be synchronized, and an effective flag, wherein the effective flag is an instant effective flag or a timing effective flag.

Preferably, the target platform may be further configured to determine whether the synchronous data stream contains the Instant effective flag or the timing effective flag; If the synchronous data stream contains the timing effective flag, store the service data to be synchronized and the serial number contained in the synchronous data stream in a temporary data module; extract the serial number in the temporary data module and service data to be updated in a formal data module, and store the serial number and the service data to be updated in a historical data module; extract the service data to be synchronized in the temporary data module, and update the service data to be updated in the formal data module with the service data to be synchronized; and delete the service data to be synchronized and the serial number in a temporary data module; and if the synchronous data stream contains the instant effective flag, extract the serial number in the synchronous data stream received and the service data to be updated in a formal data module, and store the serial number together with the service data to be updated in the historical data module; and update the service data to be updated in the formal data module with the service data to be synchronized in the synchronous data stream received.

Preferably, the source platform may be further configured to determine whether a synchronous data stream to be reversed is sent to the data buffer successfully, and if the synchronous data stream to be reversed is sent to the data buffer successfully, send a reverse flag and a serial number corresponding to the synchronous data stream to be reversed to the data buffer; or if the synchronous data stream to be reversed is sent to the data buffer unsuccessfully, send the reverse flag and the serial number corresponding to the synchronous data stream to be reversed to the data memory;

the data buffer may be further configured to send the reverse flag and the serial number corresponding to the synchronous data stream to be reversed to the target platform;

the target platform may be further configured to search for the synchronous data stream to be reversed corresponding to the serial number according to the reverse flag, and reverse the synchronous data stream to be reversed; and the data memory may be further configured to search for the synchronous data stream to be reversed corresponding to the serial number according to the reverse flag, and reverse the synchronous data stream to be reversed.

The data memory may be further configured to delete the synchronous data stream to be reversed, and determine whether the synchronous data stream to be reversed is deleted successfully;

the source platform may be further configured to, if the data memory unsuccessfully deletes the synchronous data stream to be reversed, send the serial number corresponding to the synchronous data stream to be reversed and the reverse flag to the data buffer;

the data buffer may be further configured to, if the data memory unsuccessfully deletes the synchronous data stream to be reversed, send the serial number corresponding to the synchronous data stream to be reversed and the reverse flag to the target platform; and the target platform may be further configured to, if the data memory unsuccessfully deletes the synchronous data stream to be reversed, search for the synchronous data stream to be reversed corresponding to the serial number according to the reverse flag, and reverse the synchronous data stream to be reversed.

Preferably, the target platform may be further configured to determine whether there is a synchronous data stream to be reversed corresponding to the serial number in the temporary data module according to the reverse flag, and if there is no synchronous data stream to be reversed, extract the service data stored together with the serial number in the historical data module according to the serial number, and update the synchronous data stream to be reversed in the formal data module with the service data extracted; or if there is a synchronous data stream to be reversed, delete the synchronous data stream to be reversed in the temporary data module.

Preferably, the source platform may be a broadcasting and television platform, and the target platform may be a mobile service platform.

The disclosure further provides a device for transmitting data information, which includes a data buffer and a data memory, wherein the data buffer and the data memory are the data buffer and the data memory above.

By means of the method, device and system for transmitting data information, after a data buffer sends a synchronous data stream unsuccessfully, the data buffer regularly extracts a synchronous data stream from a data memory and sends the synchronous data stream extracted to a target platform until the synchronous data stream extracted is sent successfully, in this way the number of times of synchronous data transmission and the amount of transmitted synchronous data are reduced and a large amount of network resources are thus saved.

DETAILED DESCRIPTION

It should be understood that embodiments described here are only intended to interpret the disclosure but are not intended to limit the disclosure.

In order to save network resources, a data memory and a data buffer are additionally set between two platforms in the embodiments of the disclosure. In the embodiments of the disclosure, data information transmitted between the two platforms varies with different processes. In a data synchronization process, data information transmitted is a synchronous data stream, wherein the synchronous data stream contains: service data to be synchronized, a serial number corresponding to the service data to be synchronized, and an effective flag. The effective flag may be an instant effective flag and a timing effective flag.

In a data re-sending process, data information transmitted to a data buffer from a source platform is a serial number corresponding to a synchronous data stream to be re-sent; data information transmitted to a target platform from the data buffer is a synchronous data stream to be re-sent, and the synchronous data stream to be re-sent contains: service data to be synchronized to be re-sent, a serial number corresponding to the service data to be synchronized to be re-sent, and an effective flag. The effective flag may be an instant effective flag and a timing effective flag.

In a data reversing process, data information transmitted includes: a reverse flag and a serial number corresponding to a synchronous data stream to be reversed.

Figure 1:
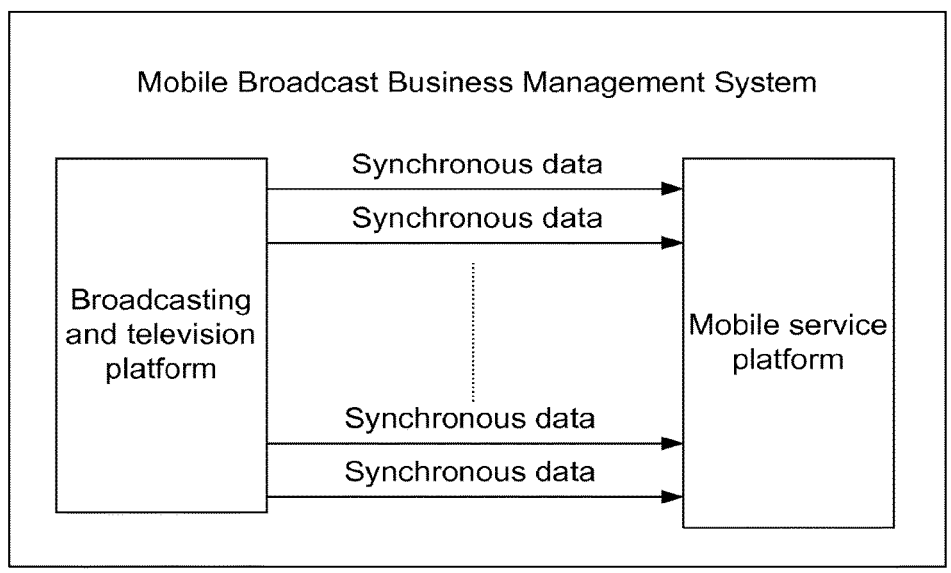
FIG. 1 shows a structural diagram of a Mobile Broadcast Business Management System (MBBMS) in a related art.
Figure 2:
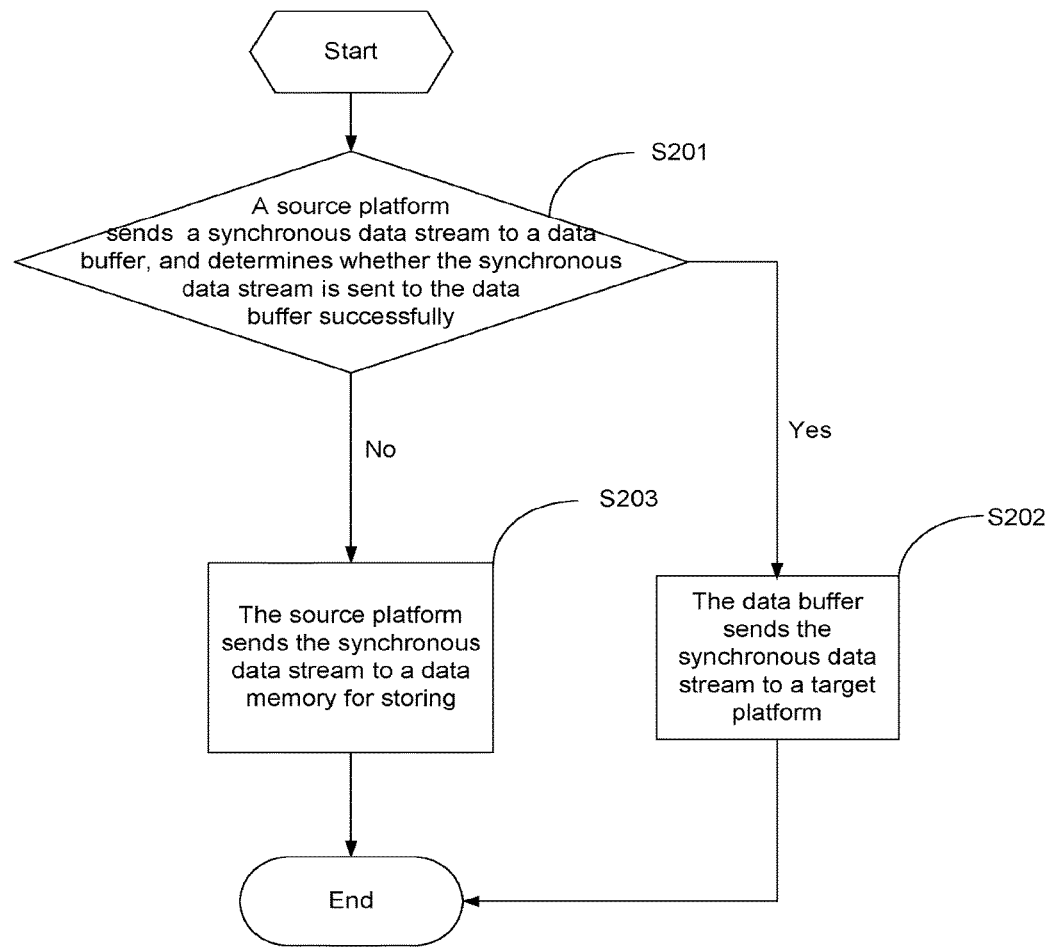
FIG. 2 shows a method for transmitting data information according to one embodiment of the disclosure.

Below is one embodiment of a method for transmitting data information, as shown in FIG. 2, which includes the following steps:

Step S201: a source platform sends a synchronous data stream to a data buffer, and determines whether the synchronous data stream is sent to the data buffer successfully; if the synchronous data stream is sent to the data buffer successfully, then Step S202 is executed; if not, then Step S203 is executed;

Step S202: the data buffer sends the synchronous data stream to a target platform; and Step S203: the source platform sends the synchronous data stream to a data memory for storing.

Figure 3:
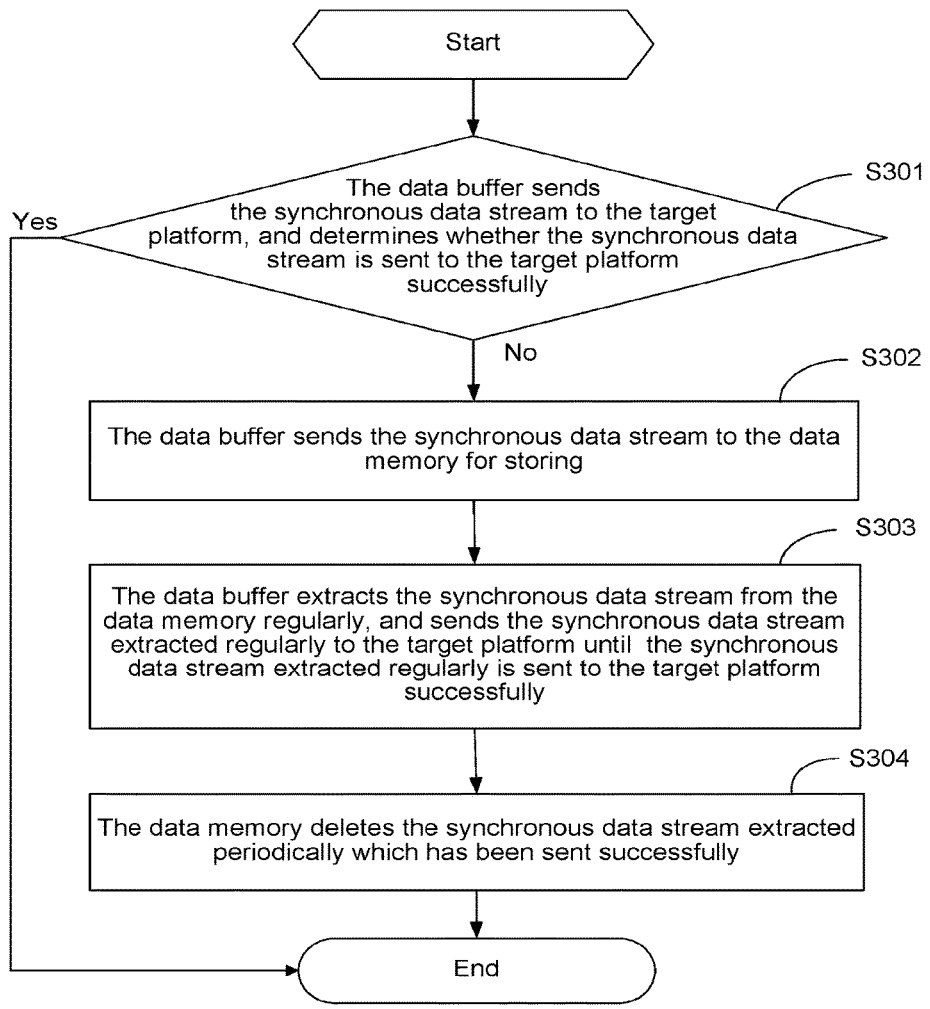
FIG. 3 shows a flowchart of regularly extracting and sending a synchronous data stream in the method for transmitting data information according to one embodiment of the disclosure.

Further, referring to FIG. 3, the above Step S202 includes:

Step S301: the data buffer sends the synchronous data stream to the target platform, and determines whether the synchronous data stream is sent to the target platform successfully; if the synchronous data stream is sent to the target platform unsuccessfully, Step S302 is executed; if the synchronous data stream is sent to the target platform successfully, the flow is ended;

Step S302: the data buffer sends the synchronous data stream to the data memory for storing, and Step S303 is executed;

Step S303: the data buffer extracts the synchronous data stream from the data memory regularly, and sends the synchronous data stream extracted to the target platform regularly until the synchronous data stream extracted regularly is sent to the target platform successfully; and Step S304 is executed;

Step S304: the data memory deletes the synchronous data stream extracted regularly which has been sent successfully.

The target platform has received the synchronous data stream and the data buffer does not need to extract the synchronous data stream from the data memory regularly and sends the synchronous data stream, therefore the synchronous data stream is deleted. In addition, the deletion of the synchronous data stream sent successfully from the data memory can release the storage space of the data memory to provide data storage space for subsequent flows.

In the embodiment, if the source platform sends the synchronous data stream to the data memory successfully and the data buffer sends the synchronous data stream to the target platform unsuccessfully, the synchronous data stream is extracted from the data memory regularly through the data buffer and sent to the target platform until the synchronous data stream extracted regularly is sent to the target platform successfully, in this way, on the basis of ensuring the success rate of synchronous data stream transmission, the number of times of synchronous data stream transmission is reduced and a large amount of network resources are saved.

The data buffer according to the embodiment of the disclosure is preset with a time period parameter used for controlling the data buffer to extract a synchronous data stream from the data memory according to actual need, and if a synchronous data stream is sent to the target platform unsuccessfully, the data buffer extracts the synchronous data stream from the data memory after a preset period according to the preset time period parameter, and sends the synchronous data stream extracted to the target platform until the synchronous data stream is sent successfully. The reason why the data buffer sends the synchronous data stream to the target platform unsuccessfully may be that the target platform is in a temporarily busy state or has a failure; after a period of time, the target platform turns to an idle state from the temporarily busy state or the failure has been eliminated, at this moment the data buffer sends the synchronous data stream to the target platform again, in this way, the number of times of synchronous data stream transmission can be reduced, the amount of synchronous data transmitted between two platforms can thus be reduced and a large amount of network resources can thus be saved.

Figure 4:
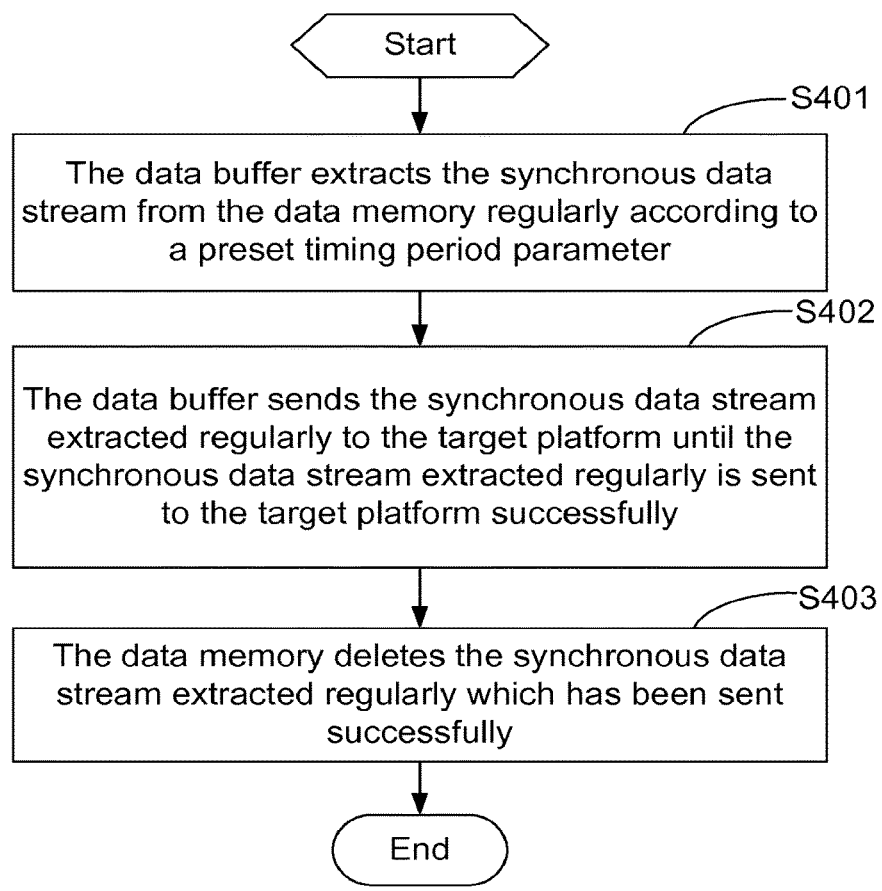
FIG. 4 shows another flowchart of regularly extracting and sending synchronous data stream in the method for transmitting data information according to one embodiment of the disclosure.

Further, referring to FIG. 4, if the source platform sends a synchronous data stream to the data buffer unsuccessfully, in order to ensure that the synchronous data stream is not lost, the data buffer regularly extracts the synchronous data stream sent unsuccessfully previously from the data memory, and sends the synchronous data stream extracted to the target platform; after Step S203 in the above embodiment, the flow further includes:

Step S401: the data buffer extracts the synchronous data stream from the data memory regularly according to a preset timing period parameter;

Step S402: the data buffer sends the synchronous data stream extracted regularly to the target platform until the synchronous data stream extracted regularly is sent to the target platform successfully; and Step S403: the data memory deletes the synchronous data stream extracted regularly which has been sent successfully.

In the embodiment, if the source platform sends the synchronous data stream to the data buffer unsuccessfully, the synchronous data stream is extracted from the data memory regularly through the data buffer and sent to the target platform until the synchronous data stream extracted regularly is sent successfully, so that, the success rate of synchronous data stream transmission is ensured, while the number of times of the synchronous data stream transmission is reduced and thus a large amount of network resources are saved.

Figure 5:
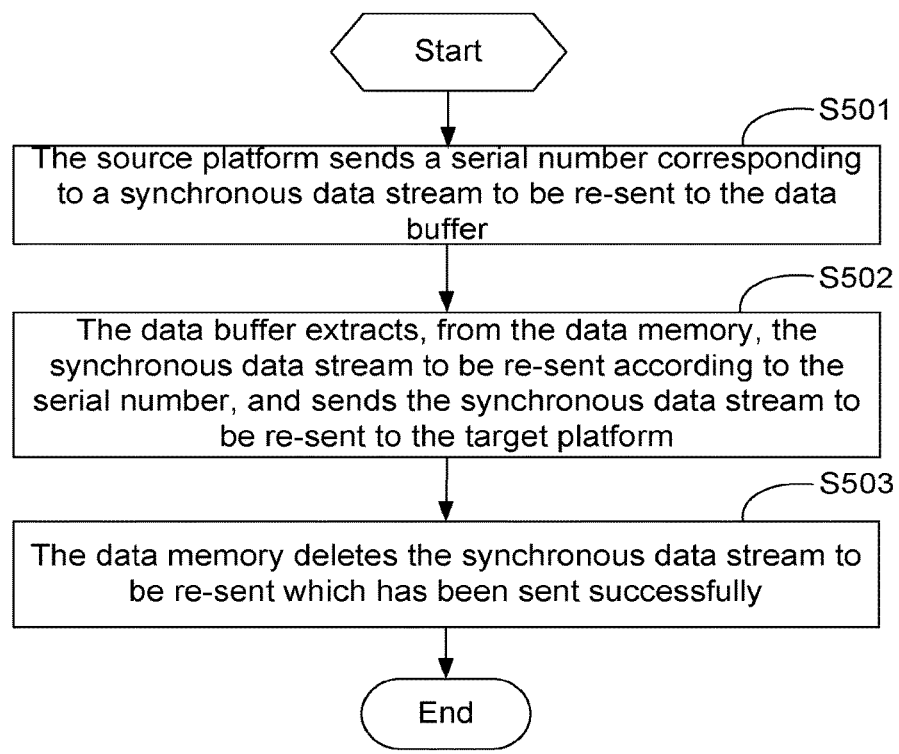
FIG. 5 shows a flowchart of re-sending a synchronous data stream in the method for transmitting data information according to one embodiment of the disclosure.

Further, referring to FIG. 5, the source platform sends the synchronous data stream to the data buffer unsuccessfully; since the target platform is in urgent need of the synchronous data stream sent unsuccessfully, the source platform is required to re-send the synchronous data stream; after the above Step S203, the re-sending process further includes:

Step S501: the source platform sends a serial number corresponding to the synchronous data stream to be re-sent to the data buffer;

Step S502: the data buffer extracts the synchronous data stream to be re-sent from the data memory according to the serial number, and sends the synchronous data stream to be re-sent to the target platform; and Step S503: the data memory deletes the synchronous data stream to be re-sent which has been sent successfully.

In the re-sending process above, the serial number corresponding to the synchronous data stream to be re-sent is only needed to be sent to the data buffer, the data buffer extracts the synchronous data stream to be re-sent from the data memory according to the serial number, and sends the synchronous data stream to be re-sent to the target platform. Since there is no need to re-send the synchronous data stream to be re-sent to the data buffer, the amount of data transmitted between the source platform and the data buffer is reduced, and thus network resources are saved.

Figure 6:
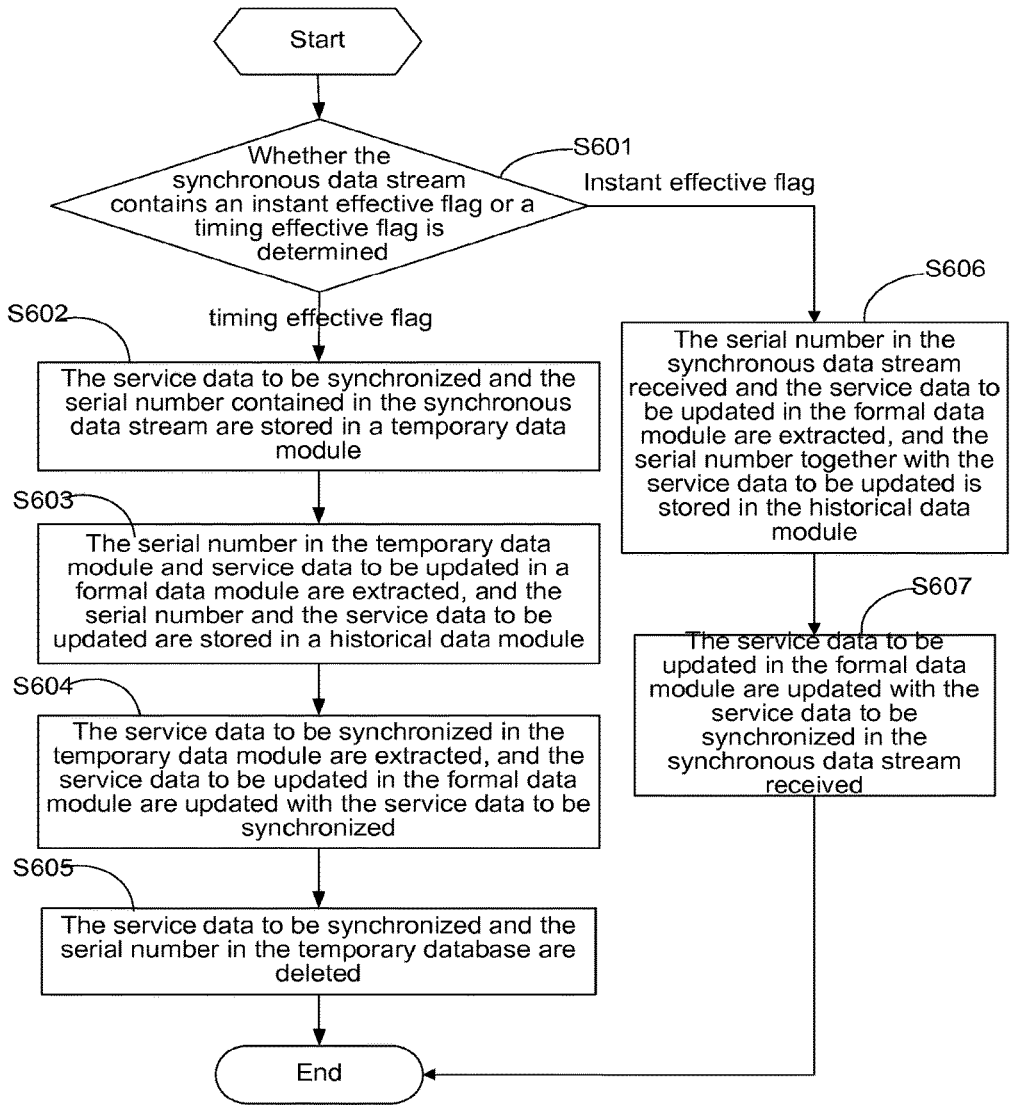
FIG. 6 shows a flowchart of updating a synchronous data stream by a target platform in the method for transmitting data information according to one embodiment of the disclosure.

Further, referring to FIG. 6, after the target platform receives the synchronous data stream, the method further includes:

Step S601: whether the synchronous data stream contains an instant effective flag or a timing effective flag is determined; if the synchronous data stream contains a timing effective flag, Step S602 is executed; if the synchronous data stream contains an instant effective flag, Step S606 is executed;

Step S602: the service data to be synchronized and the serial number contained in the synchronous data stream are stored in a temporary data module;

Step S603: the serial number in the temporary data module and service data to be updated in a formal data module are extracted, and the serial number and the service data to be updated are stored in a historical data module;

Step S604: the service data to be synchronized in the temporary data module are extracted, and the service data to be updated in the formal data module are updated with the service data to be synchronized;

Step S605: the service data to be synchronized and the serial number in the temporary data module are deleted;

the purpose of deleting the service data to be synchronized in this step is to prevent the target platform from extracting the service data to be synchronized in the synchronous data stream to be reversed from the temporary data module and from updating the formal data module with the service data to be synchronized;

Step S606: the serial number in the synchronous data stream received and the service data to be updated in the formal data module are extracted, and the serial number together with the service data to be updated is stored in the historical data module;

Step S607: the service data to be updated in the formal data module are updated with the service data to be synchronized in the synchronous data stream received.

Preferably, the synchronous data stream above further contains a non-reverse flag; after receiving the synchronous data stream, the target platform first determines whether the synchronous data stream contains a non-reverse flag or a reverse flag, if the synchronous data stream contains a non-reverse flag, Step S601 to Step S607 above are executed.

Figure 7:
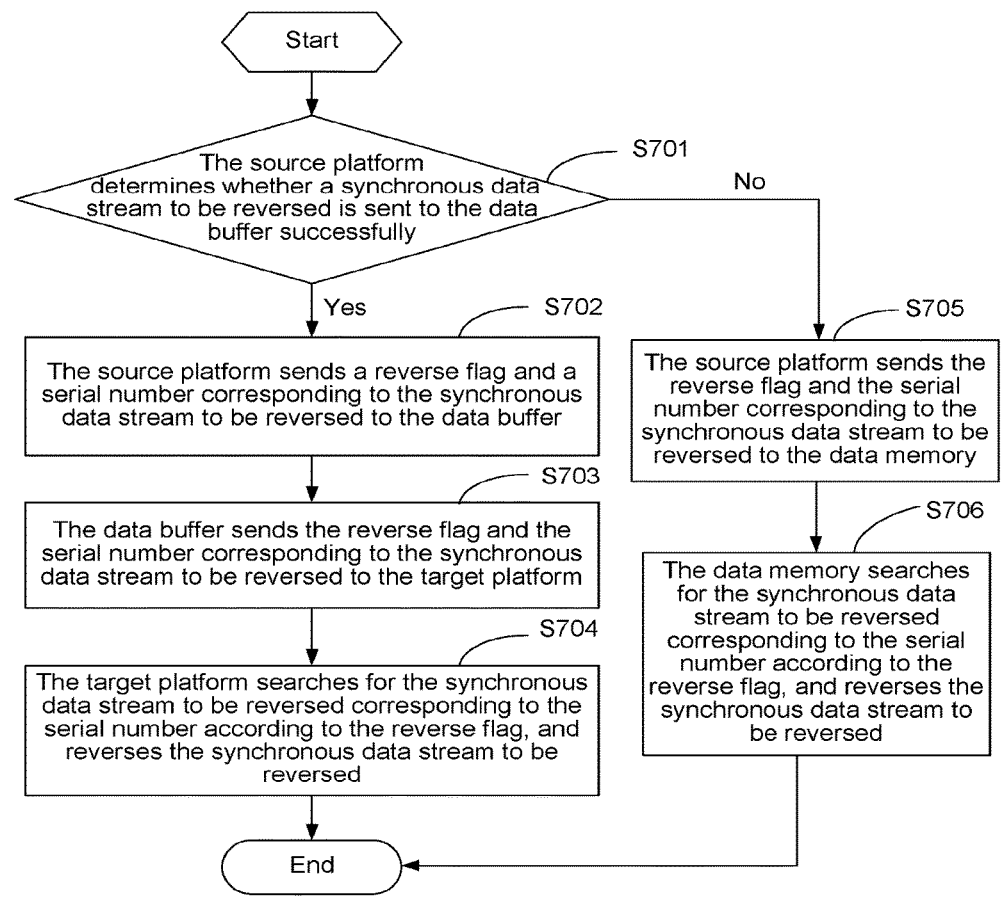
FIG. 7 shows a flowchart of reversing a synchronous data stream in the method for transmitting data information according to one embodiment of the disclosure.

Further, in one embodiment of the method for transmitting data information according to the embodiment of the disclosure, after sending the synchronous data stream to the data buffer, the source platform finds that the synchronous data stream sent is incorrect, in order to ensure the correctness of service data updated in the target platform, the incorrect synchronous data stream is reversed; referring to FIG. 7, the steps are as follows:

Step S701: the source platform determines whether a synchronous data stream to be reversed is sent to the data buffer successfully; if the synchronous data stream to be reversed is sent to the data buffer successfully, Step S702 is executed; if not, Step S705 is executed;

Step S702: the source platform sends a reverse flag and a serial number corresponding to the synchronous data stream to be reversed to the data buffer;

Step S703: the data buffer sends the reverse flag and the serial number corresponding to the synchronous data stream to be reversed to the target platform;

Step S704: the target platform searches for the synchronous data stream to be reversed corresponding to the serial number according to the reverse flag, and reverses the synchronous data stream to be reversed;

Step S705: the source platform sends the reverse flag and the serial number corresponding to the synchronous data stream to be reversed to the data memory; and Step S706: the data memory searches for the synchronous data stream to be reversed corresponding to the serial number according to the reverse flag, and reverses the synchronous data stream to be reversed.

The operation of reversing the synchronous data stream to be reversed in this step is: deleting the synchronous data stream to be reversed from the data memory so as to release the data storage space of the data memory, and to prevent the data buffer from regularly extracting the synchronous data stream to be reversed from the data memory and from sending the synchronous data stream to be reversed to the target platform, thus effectively preventing incorrect sending of data.

Figure 8:
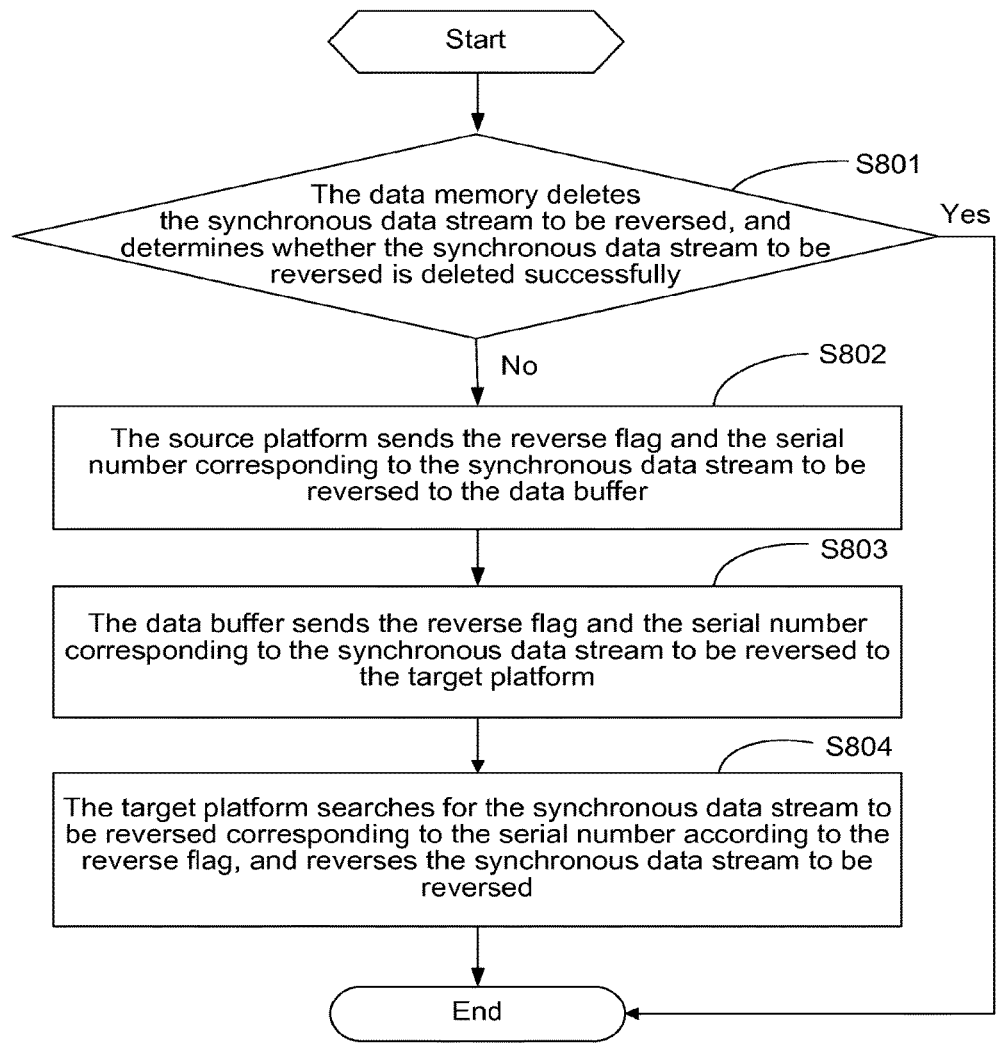
FIG. 8 shows another flowchart of reversing a synchronous data stream in the method for transmitting data information according to one embodiment of the disclosure.

Further, referring to FIG. 8, in the embodiment above of the method for transmitting data information according to the embodiment of the disclosure, the step of reversing the synchronous data stream to be reversed by the data memory includes:

Step S801: the data memory deletes the synchronous data stream to be reversed, and determines whether the synchronous data stream to be reversed is deleted successfully; if the synchronous data stream to be reversed is deleted unsuccessfully, Step S802 is executed; if the synchronous data stream to be reversed is deleted successfully, the flow is ended;

in the step, the data memory deletes the synchronous data stream to be reversed, therefore the data storage space of the data memory can be released in time, and the data buffer can be prevented from extracting the synchronous data stream to be reversed from the data memory regularly and from sending the synchronous data stream to be reversed to the target platform, so that incorrect sending of data can be reduced;

if the synchronous data stream to be reversed is deleted unsuccessfully, it is indicated that the synchronous data stream in the data memory is extracted by the data buffer regularly and sent to the target platform successfully, and then deleted successfully after the synchronous data stream is sent to the target platform;

Step S802: the source platform sends the reverse flag and the serial number corresponding to the synchronous data stream to be reversed to the data buffer;

Step S803: the data buffer sends the reverse flag and the serial number corresponding to the synchronous data stream to be reversed to the target platform; and Step S804: the target platform searches for the synchronous data stream to be reversed corresponding to the serial number according to the reverse flag, and reverses the synchronous data stream to be reversed;

the step of reversing the synchronous data stream to be reversed in the step has been described in the above embodiment, and thus it needs not to be repeated here.

Figure 9:
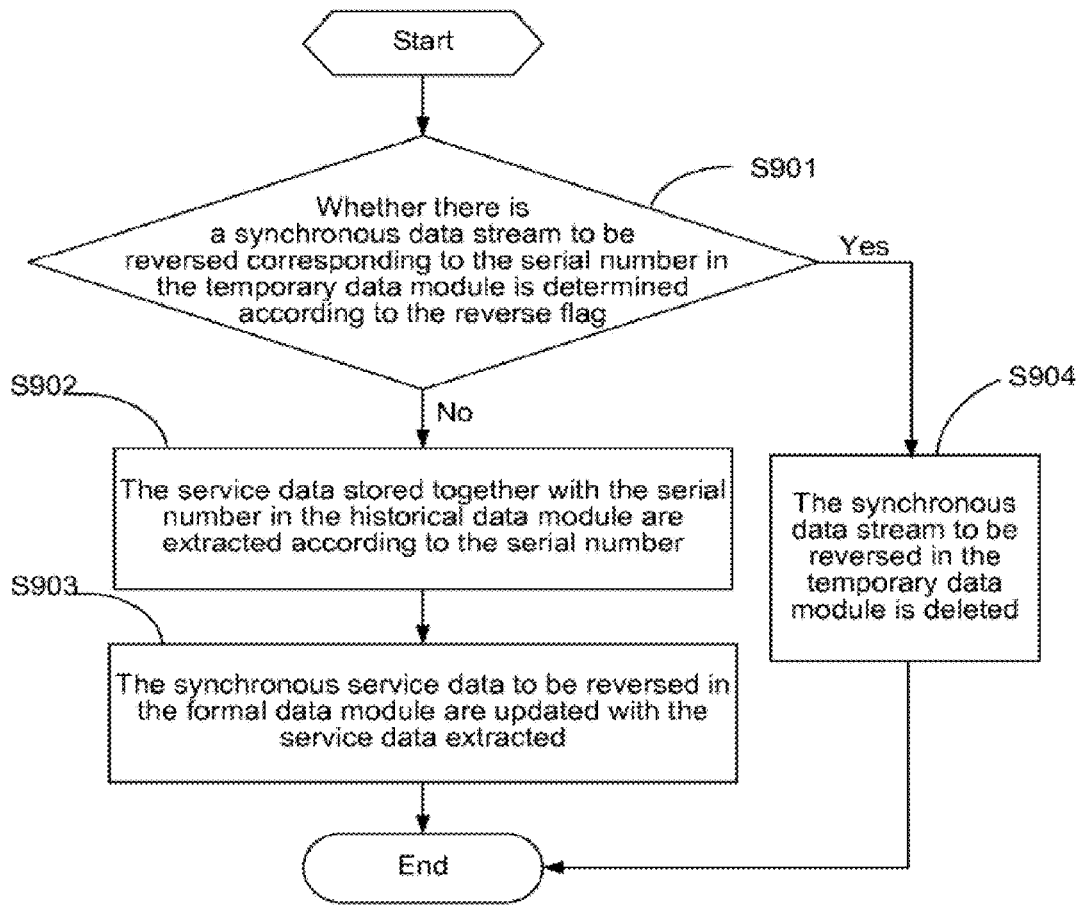
FIG. 9 shows a flowchart of reversing a synchronous data stream by a target platform in the method for transmitting data information according to one embodiment of the disclosure.

Further, referring to FIG. 9, the process above that the target platform reverses the synchronous data stream to be reversed includes:

Step S901: whether there is a synchronous data stream to be reversed corresponding to the serial number in the temporary data module is determined according to the reverse flag; if there is no synchronous data stream to be reversed, Step S902 is executed; and if there is a synchronous data stream to be reversed, Step S904 is executed;

Step S902: the service data stored together with the serial number in the historical data module are extracted according to the serial number;

the purpose of storing the serial number extracted together with the service data to be updated in a historical backup data module in this step is for preventing, if the source platform sends service data to be synchronized incorrectly, searching for the service data to be updated according to the serial number and updating incorrect service data to be synchronized in the formal data module with the service data to be updated, wherein the incorrect service data to be synchronized are the service data to be synchronized previously sent by the source platform;

Step S903: the service data to be synchronized to be reversed in the formal data module are updated with the service data extracted;

the service data to be synchronized to be reversed in this step is the service data to be synchronized in the synchronous data stream sent by the source platform, and the original service data of the target platform are updated with the service data to be synchronized to be reversed; the service data to be synchronized to be reversed are incorrect data, and the operation of reversing the service data to be synchronized to be reversed is: updating the service data to be synchronized to be reversed with the original service data of the target platform;

Step S904: the synchronous data stream to be reversed in the temporary data module is deleted.

Further, besides the reverse flag and the serial number, the data information transmitted in the above reverse process further contains an instant effective flag; after receiving the data information, the target platform further needs to determine whether the data information contains an instant effective flag, and if the data information contains an instant effective flag, performs reverse processing on the synchronous data stream to be reversed according to the instant effective flag.

In the above reverse process, the data information received by the target platform contains the reverse flag, the serial number corresponding to the synchronous data stream to be reversed, and the instant effective flag, but does not contain specific service data to be synchronized, therefore, the amount of transmitted data is reduced and thus a large amount of network resource are saved.

The method for transmitting data information according to the embodiment of the disclosure applies to multiple types of network systems, for example, applying to synchronous data transmission between a broadcasting and television platform and a mobile service platform in a system for transmitting data information at this moment a source platform is the broadcasting and television platform in the system for transmitting data information a target platform is the mobile service platform in the system for transmitting data information, and data information sent by the source platform to the target platform includes: a serial number, a reverse flag and an effective flag. Data information sent in a data synchronization process further includes specific service data. Below are program codes in the process of transmitting a synchronous data stream from the broadcasting and television platform in the system for transmitting data information to the mobile service platform.

```
<XXX.REQ Accounting="0001" Instant="true" reverse="false">
    <!-- content of service data -->
    ...
    ...
</XXX.REQ>
``` wherein Accounting represents a serial number, and Accounting="0001" represents that the serial number of data to be synchronized is "0001"; Instant represents an effective flag, and Instant="true" represents becoming effective instantly; and reverse is used for representing a reverse flag, wherein reverse="false" represents non-reverse.

Figure 10:
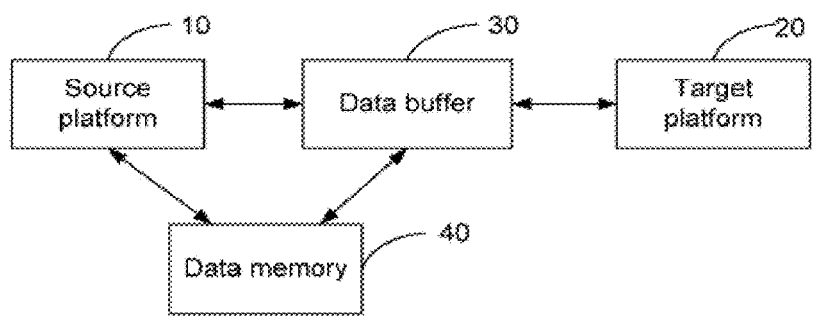
FIG. 10 shows a structural diagram of a system for transmitting data information according to one embodiment of the disclosure.

A system for transmitting data information according to one embodiment of the disclosure, as shown in FIG. 10, includes: a source platform 10, a target platform 20, a date memory 40 and a data buffer 30; wherein the source platform 10 is configured to send a synchronous data stream to the data buffer 30 and determine whether the synchronous data stream is sent to the data buffer 30 successfully, and when the synchronous data stream is sent to the data buffer 30 unsuccessfully, send the synchronous data stream sent unsuccessfully to the data memory 40;

the data buffer 30 is configured to, when receiving the synchronous data stream from the source platform 10 successfully, send the synchronous data stream received successfully to the target platform 20;

the data memory 40 is configured to store the synchronous data stream sent unsuccessfully from the source platform 10 to the data buffer 30, in order to ensure that the synchronous data stream is not lost and to make preparation for a subsequent re-sending process of the synchronous data stream and a subsequent extracting process regularly performed by the data buffer; and the target platform 20 is configured to receive the synchronous data stream sent by the data buffer 30, and perform subsequent processing on the synchronous data stream received.

Further, in the system for transmitting data information according to the embodiment of the disclosure, the data buffer 30 is further configured to send the synchronous data stream to the target platform 20 and determine whether the synchronous data stream is sent to the target platform 20 successfully; the data buffer 30 is configured with a time period parameter according to actual need, and if the synchronous data stream is sent to the target platform 20 unsuccessfully, the data buffer 30 sends the synchronous data stream to the data memory 40, then extracts the synchronous data stream from the data memory 40 regularly according to the time period parameter, and sends the synchronous data stream extracted regularly to the target platform 20, which ensures that the synchronous data stream is sent successfully. Comparing with the related art, the number of times of transmission can be decreased within the same time, so that the service burden of a system can be reduced, the efficiency of data transmission can be improved, and a large amount of network sources can be saved.

The data memory 40 is further configured to store the synchronous data stream sent by the data buffer 30 and delete the synchronous data stream extracted regularly which has been sent successfully. Since the data memory 40 deletes the stored synchronous data stream which has been sent successfully, the data buffer can be prevented from repeatedly sending the synchronous data stream which has been sent successfully to the target platform 20 after a timing period, and the data storage space of the data memory 40 is released and thus network resources are saved.

Further, the data buffer 30 is further configured to, after the source platform 10 sends the synchronous data stream to the data buffer 30 unsuccessfully, extract the synchronous data stream from the data memory 40 regularly according to the preset timing period parameter; and send the synchronous data stream extracted regularly to the target platform 20 until the synchronous data stream extracted regularly is sent to the target platform 20 successfully, which ensures a success rate of synchronous data stream transmission; and the data memory 40 is further configured to, after the source platform 10 sends the synchronous data stream to the data buffer 30 unsuccessfully, store the synchronous data stream sent by the source platform 10, and delete the synchronous data stream extracted regularly which has been sent successfully.

Further, in the system for transmitting data information, the source platform 10 is further configured to send a serial number corresponding to a synchronous data stream to be re-sent to the data buffer 30; the data buffer 30 is further configured to extract the synchronous data stream to be re-sent from the data memory 40 according to the serial number, and send the synchronous data stream to be re-sent to the target platform 20; compared with the related art, the source platform 10 does not need to re-send service data to be synchronized, which reduces the amount of data transmitted between the source platform 10 and the data buffer 30.

The data memory 40 is further configured to delete the synchronous data stream to be re-sent which has been sent successfully, which prevents the data buffer 30 from extracting, after a timing period, the synchronous data stream which has been re-sent successfully from the data memory 40 and repeatedly sending the synchronous data stream to the target platform 20. At the same time, the data storage space of the data memory 40 can further be released, so as to save network resources.

Further, the synchronous data stream contains: service data to be synchronized, a serial number corresponding to the service data to be synchronized, and an effective flag, wherein the effective flag is an instant effective flag or a timing effective flag.

Preferably, the target platform 20 above is further configured to, determine whether the synchronous data stream contains an instant effective flag or a timing effective flag; if the synchronous data stream contains a timing effective flag, store the service data to be synchronized and the serial number contained in the synchronous data stream in a temporary data module; extract the serial number in the temporary data module and service data to be updated in a formal data module, and store the serial number and the service data to be updated in a historical data module; extract the service data to be synchronized in the temporary data module, and update the service data to be updated in the formal data module with the service data to be synchronized; and delete the service data to be synchronized and the serial number in the temporary data module; and if the synchronous data stream contains an instant effective flag, extract the serial number in the synchronous data stream received and the service data to be updated in the formal data module, and store the serial number together with the service data to be updated in the historical data module; and update the service data to be updated in the formal data module with the service data to be synchronized in the synchronous data stream received.

Further, the synchronous data stream further contains a non-reverse flag; and the target platform 20 is further configured to, after receiving the synchronous data stream, determine whether the synchronous data stream contains the non-reverse flag.

Further, in the system for transmitting data information according to the embodiment of the disclosure, the source platform 10 is further configured to determine whether a synchronous data stream to be reversed is sent to the data buffer 30 successfully, and it the synchronous data stream to be reversed is sent to the data buffer 30 successfully, send a reverse flag and a serial number corresponding to the synchronous data stream to be reversed to the data buffer 30; or if the synchronous data stream to be reversed is sent to the data buffer 30 unsuccessfully, send the reverse flag and the serial number corresponding to the synchronous data stream to be reversed to the data memory 40.

The data buffer 30 is further configured to send the reverse flag and the serial number corresponding to the synchronous data stream to be reversed to the target platform 20.

The target platform 20 is further configured to search for the synchronous data stream to be reversed corresponding to the serial number according to the reverse flag, and reverse the synchronous data stream to be reversed.

The process that the target platform 20 reverses the synchronous data stream to be reversed is: searching whether there is a synchronous data stream to be reversed corresponding to the serial number in the temporary data module according to the reverse flag; if there is the synchronous data stream to be reversed, deleing the synchronous data stream to be reversed from the temporary data module; if there is no synchronous data stream to be reversed, searching the historical backup data module for the service data stored together with the serial number according to the serial number; and extracting the service data that are found and updating the synchronous data to be reversed in the formal data module with the service data extracted.

The service data searched above are original service data of the target platform 20, and the original service data in the formal data module of the target platform 20 have been updated previously with the service data to be synchronized transmitted by the source platform 10.

The data memory 40 is further configured to search for the synchronous data stream to be reversed corresponding to the serial number according to the reverse flag, and reverse the synchronous data stream to be reversed.

Further, the data memory 40 above is further configured to delete the synchronous data stream to be reversed, and determine whether the synchronous data stream to be reversed is deleted successfully. After receiving the reverse flag, the data memory 40 searches for the synchronous data stream corresponding to the serial number according to the reverse flag, and deletes the synchronous data stream that is found. The data memory 40 deletes the synchronous data stream to be reversed, thereby releasing the data storage space of the data memory 40 in time, and preventing the data buffer 30 from regularly extracting the synchronous data stream to be reversed from the data memory 40 and sending the synchronous data stream to be reversed to the target platform 20, and further preventing incorrect sending of service data to be synchronized.

If the synchronous data stream to be reversed is deleted unsuccessfully, it is indicated that the synchronous data stream in the data memory 40 is extracted regularly through the data buffer 30 and sent to the target platform 20, and deleted successfully after being sent to the target platform 20. It is necessary for the source platform 10 to send the reverse flag and the serial number corresponding to the synchronous data stream to be reversed to the data buffer 30.

The source platform 10 is further configured to, if the data memory 40 unsuccessfully deletes the synchronous data stream to be reversed, send the serial number corresponding to the synchronous data stream to be reversed and the reverse flag to the data buffer 30.

The data buffer 30 is further configured to, if the data memory 40 unsuccessfully deletes the synchronous data stream to be reversed, send the serial number corresponding to the synchronous data stream to be reversed and the reverse flag to the target platform 20.

The target platform 20 is further configured to, if the data memory 40 unsuccessfully deletes the synchronous data stream to be reversed, search for the synchronous data stream to be reversed corresponding to the serial number according to the reverse flag, and reverse the synchronous data stream to be reversed.

Further, the target platform 20 above is further configured to determine whether there is a synchronous data stream to be reversed corresponding to the serial number in the temporary data module according to the reverse flag, and if there is no synchronous data stream to be reversed, extract the service data stored together with the serial number in the historical data module according to the serial number, and update the service data to be synchronized to be reversed in the formal data module with the service data extracted; or if there is the synchronous data stream to be reversed, delete the synchronous data stream to be reversed in the temporary data module.

Further, the target platform 20 is further configured to check whether received data information contains an instant effective flag, and perform instant reverse processing on the synchronous data stream to be reversed according to the instant effective flag.

The data information which is sent from the source platform 10 to the data buffer 30 and then from the data buffer 30 to the target platform 20 only contains: the reverse flag, the serial number corresponding to the synchronous data stream to be reversed, and the instant effective flag, but does not contain specific service data to be synchronized. Therefore, the amount of transmitted data is reduced and thus a large amount of network resources are saved.

Further, in the system for transmitting data information according to the embodiment of the disclosure, the source platform 10 is a broadcasting and television platform and the target platform 20 is a mobile service platform.

Figure 11:
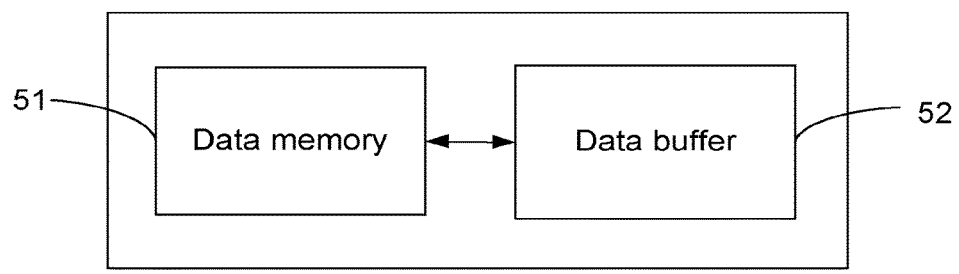
FIG. 11 shows a structural diagram of a device for transmitting data information according to one embodiment of the disclosure.

A device for transmitting data information according to one embodiment of the disclosure, as shown in FIG. 11, includes a data buffer 62 and a data memory 51, wherein the data buffer 52 and the data memory 51 are the data buffer 30 and the data memory 40 involved in the system for transmitting data information according to the embodiment of the disclosure, therefore no details are given again.

In the method, device and system for transmitting data information for transmitting data information, a synchronous data stream sent unsuccessfully is stored in the data memory 40, the data buffer 30 regularly extracts the synchronous data stream from the data memory 40 and sends the synchronous data stream extracted to the target platform 20 until the synchronous data stream extracted is sent successfully. Compared with the related art, the number of times of synchronous data transmission and the amount for transmitted synchronous data are reduced, and a large amount of network resources are thus saved.

It should be understood that the above are the preferable embodiments of the disclosure and are not intended to limit the scope of protection of the subject application; and any equivalent structure or equivalent process change made by using the content of the description and drawings of the subject application, or directly or indirectly applied to other related technical fields should fall within the scope of protection of the subject application.

The invention claimed is:

1. A Mobile Broadcast Business Management System (MBBMS), comprising: a source platform, a target platform, a data memory and a data buffer; wherein
   the source platform is configured to send a synchronous data stream to the data buffer and determine whether the synchronous data stream is sent to the data buffer successfully, and if the synchronous data stream is sent to the data buffer unsuccessfully, send the synchronous data stream sent unsuccessfully to the data memory;
   the data buffer is configured to, when receiving the synchronous data stream from the source platform successfully, send the synchronous data stream received successfully to the target platform; and
   the data memory is configured to store the synchronous data stream which is sent unsuccessfully from the source platform to the data buffer;
   wherein the synchronous data stream contains: service data to be synchronized, a serial number corresponding to the service data to be synchronized, and an effective flag, wherein the effective flag is an instant effective flag or a timing effective flag;
   Wherein the target platform is further configured to determine whether the synchronous data stream contains an instant effective flag or a timing effective flag;
   if the synchronous data stream contains a timing effective flag, storing the service data to be synchronized and the serial number contained in the synchronous data stream in a temporary data module; extracting the serial number in the temporary data module and service data to be updated in a formal data module, and storing the serial number and the service data to be updated in a historical data module; extracting the service data to be synchronized in the temporary data module, and updating the service data to be updated in the formal data module with the service data to be synchronized; and deleting the service data to be synchronized and the serial number in the temporary data module.

2. The MBBMS according to claim 1, wherein
   the data buffer is further configured to determine whether the synchronous data stream is sent to the target platform successfully; if the synchronous data stream is sent to the target platform unsuccessfully, send the synchronous data stream to the data memory, extract the synchronous data stream from the data memory regularly according to a preset timing period parameter, and send the synchronous data stream extracted regularly to the target platform; and
   the data memory is further configured to store the synchronous data stream sent by the data buffer, and delete the synchronous data stream extracted regularly which has been sent successfully.

3. The MBBMS according to claim 2, wherein
   the data buffer is further configured to, after the source platform sends the synchronous data stream to the data buffer unsuccessfully, extract the synchronous data stream from the data memory regularly according to the preset timing period parameter; and send the synchronous data stream extracted regularly to the target platform until the synchronous data stream extracted regularly is sent to the target platform successfully; and the data memory is further configured to, after the source platform sends the synchronous data stream to the data buffer unsuccessfully, store the synchronous data stream sent by the source platform, and delete the synchronous data stream extracted regularly which has been sent successfully.

4. The MBBMS according to claim 3, wherein
the source platform is further configured to send a serial number corresponding to a synchronous data stream to be re-sent to the data buffer;
the data buffer is further configured to extract the synchronous data stream to be re-sent from the data memory according to the serial number, and send the synchronous data stream to be re-sent to the target platform; and
the data memory is further configured to delete the synchronous data stream to be re-sent which has been sent successfully.

5. The MBBMS according to claim 4, wherein
the target platform is further configured to determine whether the synchronous data stream contains the instant effective flag or the timing effective flag; if the synchronous data stream contains the instant effective flag, extract the serial number in the synchronous data stream received and the service data to be updated in the formal data module and store the serial number together with the service data to be updated in a historical data module; and update the service data to be updated in a formal data module with the service data to be synchronized in the synchronous data stream received.

6. The MBBMS according to claim 5, wherein
the source platform is further configured to determine whether a synchronous data stream to be reversed is sent to the data buffer successfully, and if the synchronous data stream to be reversed is sent successfully to the data buffer, send a reverse flag and a serial number corresponding to the synchronous data stream to be reversed to the data buffer; or if the synchronous data stream to be reversed is sent unsuccessfully to the data buffer, send the reverse flag and the serial number corresponding to the synchronous data stream to be reversed to the data memory;
the data buffer is further configured to send the reverse flag and the serial number corresponding to the synchronous data stream to be reversed to the target platform;
the target platform is further configured to search for the synchronous data stream to be reversed corresponding to the serial number according to the reverse flag, and reverse the synchronous data stream to be reversed; and
the data memory is further configured to search for the synchronous data stream to be reversed corresponding to the serial number according to the reverse flag, and reverse the synchronous data stream to be reversed.

7. The MBBMS according to claim 6, wherein
the data memory is further configured to delete the synchronous data stream to be reversed, and determine whether the synchronous data stream to be reversed is deleted successfully;

the source platform is further configured to, if the data memory unsuccessfully deletes the synchronous data stream to be reversed, send the serial number corresponding to the synchronous data stream to be reversed and the reverse flag to the data buffer;
the data buffer is further configured to, if the data memory unsuccessfully deletes the synchronous data stream to be reversed, send the serial number corresponding to the synchronous data stream to be reversed and the reverse flag to the target platform; and
the target platform is further configured to, if the data memory unsuccessfully deletes the synchronous data stream to be reversed, search for the synchronous data stream to be reversed corresponding to the serial number according to the reverse flag, and reverse the synchronous data stream to be reversed.

8. The MBBMS according to claim 7, wherein
the target platform is further configured to determine whether there is a synchronous data stream to be reversed corresponding to the serial number in the temporary data module according to the reverse flag, and if there is no synchronous data stream to be reversed, extract the service data stored together with the serial number in the historical data module according to the serial number, and update the synchronous data stream to be reversed in the formal data module with the service data extracted; or if there is a synchronous data stream to be reversed, delete the synchronous data stream to be reversed in the temporary data module.

9. The MBBMS according to claim 8, wherein the source platform is a broadcasting and television platform and the target platform is a mobile service platform.

10. A device for transmitting data information, comprising: a data buffer and a data memory, wherein the data buffer and the data memory are the data buffer and the data memory according to claim 9.

11. The MBBMS according to claim 3, wherein
the target platform is further configured to determine whether the synchronous data stream contains the instant effective flag or the timing effective flag; if the synchronous data stream contains the instant effective flag, extract the serial number in the synchronous data stream received and the service data to be updated in the formal data module and store the serial number together with the service data to be updated in the historical data module; and update the service data to be updated in a formal data module with the service data to be synchronized in the synchronous data stream received.

12. The MBBMS according to claim 11, wherein
the source platform is further configured to determine whether a synchronous data stream to be reversed is sent to the data buffer successfully, and if the synchronous data stream to be reversed is sent successfully to the data buffer, send a reverse flag and a serial number corresponding to the synchronous data stream to be reversed to the data buffer; or if the synchronous data stream to be reversed is sent unsuccessfully to the data buffer, send the reverse flag and the serial number corresponding to the synchronous data stream to be reversed to the data memory;
the data buffer is further configured to send the reverse flag and the serial number corresponding to the synchronous data stream to be reversed to the target platform;

the target platform is further configured to search for the synchronous data stream to be reversed corresponding to the serial number according to the reverse flag, and reverse the synchronous data stream to be reversed; and the data memory is further configured to search for the synchronous data stream to be reversed corresponding to the serial number according to the reverse flag, and reverse the synchronous data stream to be reversed.

13. The MBBMS according to claim 12, wherein the data memory is further configured to delete the synchronous data stream to be reversed, and determine whether the synchronous data stream to be reversed is deleted successfully;

the source platform is further configured to, if the data memory unsuccessfully deletes the synchronous data stream to be reversed, send the serial number corresponding to the synchronous data stream to be reversed and the reverse flag to the data buffer;

the data buffer is further configured to, if the data memory unsuccessfully deletes the synchronous data stream to be reversed, send the serial number corresponding to the synchronous data stream to be reversed and the reverse flag to the target platform; and the target platform is further configured to, if the data memory unsuccessfully deletes the synchronous data stream to be reversed, search for the synchronous data stream to be reversed corresponding to the serial number according to the reverse flag, and reverse the synchronous data stream to be reversed.

14. The MBBMS according to claim 13, wherein the target platform is further configured to determine whether there is a synchronous data stream to be reversed corresponding to the serial number in the temporary data module according to the reverse flag, and if there is no synchronous data stream to be reversed, extract the service data stored together with the serial number in the historical data module according to the serial number, and update the synchronous data stream to be reversed in the formal data module with the service data extracted; or if there is a synchronous data stream to be reversed, delete the synchronous data stream to be reversed in the temporary data module.

15. The MBBMS according to claim 14, wherein the source platform is a broadcasting and television platform and the target platform is a mobile service platform.

16. A device for transmitting data information, comprising: a data buffer and a data memory, wherein the data buffer and the data memory are the data buffer and the data memory according to claim 15.

17. The MBBMS according to claim 2, wherein the target platform is further configured to determine whether the synchronous data stream contains the instant effective flag or the timing effective flag; if the synchronous data stream contains the instant effective flag, extract the serial number in the synchronous data stream received and the service data to be updated in the formal data module and store the serial number together with the service data to be updated in a historical data module; and update the service data to be updated in a formal data module with the service data to be synchronized in the synchronous data stream received.

18. The MBBMS according to claim 17, wherein the source platform is further configured to determine whether a synchronous data stream to be reversed is sent to the data buffer successfully, and if the synchronous data stream to be reversed is sent successfully to the data buffer, send a reverse flag and a serial number corresponding to the synchronous data stream to be reversed to the data buffer; or if the synchronous data stream to be reversed is sent unsuccessfully to the data buffer, send the reverse flag and the serial number corresponding to the synchronous data stream to be reversed to the data memory;

the data buffer is further configured to send the reverse flag and the serial number corresponding to the synchronous data stream to be reversed to the target platform;

the target platform is further configured to search for the synchronous data stream to be reversed corresponding to the serial number according to the reverse flag, and reverse the synchronous data stream to be reversed; and the data memory is further configured to search for the synchronous data stream to be reversed corresponding to the serial number according to the reverse flag, and reverse the synchronous data stream to be reversed.

19. The MBBMS according to claim 18, wherein the data memory is further configured to delete the synchronous data stream to be reversed, and determine whether the synchronous data stream to be reversed is deleted successfully;

the source platform is further configured to, if the data memory unsuccessfully deletes the synchronous data stream to be reversed, send the serial number corresponding to the synchronous data stream to be reversed and the reverse flag to the data buffer;

the data buffer is further configured to, if the data memory unsuccessfully deletes the synchronous data stream to be reversed, send the serial number corresponding to the synchronous data stream to be reversed and the reverse flag to the target platform; and the target platform is further configured to, if the data memory unsuccessfully deletes the synchronous data stream to be reversed, search for the synchronous data stream to be reversed corresponding to the serial number according to the reverse flag, and reverse the synchronous data stream to be reversed.

20. The MBBMS according to claim 19, wherein the target platform is further configured to determine whether there is a synchronous data stream to be reversed corresponding to the serial number in the temporary data module according to the reverse flag, and if there is no synchronous data stream to be reversed, extract the service data stored together with the serial number in the historical data module according to the serial number, and update the synchronous data stream to be reversed in the formal data module with the service data extracted; or if there is a synchronous data stream to be reversed, delete the synchronous data stream to be reversed in the temporary data module.

21. The MBBMS according to claim 20, wherein the source platform is a broadcasting and television platform and the target platform is a mobile service platform.

22. A device for transmitting data information, comprising: a data buffer and a data memory, wherein the data buffer and the data memory are the data buffer and the data memory according to claim 21.

23. The MBBMS according to claim 1, wherein the target platform is further configured to determine whether the synchronous data stream contains the instant effective flag or the timing effective flag; if the synchronous data stream contains the instant effective flag, extract the serial number in the synchronous data stream received and the service data to be updated in the formal data module and store the serial number together with the service data to be updated in a historical data module; and update the service data to be updated in a formal data module with the service data to be synchronized in the synchronous data stream received.

24. The MBBMS according to claim 23, wherein
the source platform is further configured to determine whether a synchronous data stream to be reversed is sent to the data buffer successfully, and if the synchronous data stream to be reversed is sent successfully to the data buffer, send a reverse flag and a serial number corresponding to the synchronous data stream to be reversed to the data buffer; or if the synchronous data stream to be reversed is sent unsuccessfully to the data buffer, send the reverse flag and the serial number corresponding to the synchronous data stream to be reversed to the data memory;
the data buffer is further configured to send the reverse flag and the serial number corresponding to the synchronous data stream to be reversed to the target platform;
the target platform is further configured to search for the synchronous data stream to be reversed corresponding to the serial number according to the reverse flag, and reverse the synchronous data stream to be reversed; and
the data memory is further configured to search for the synchronous data stream to be reversed corresponding to the serial number according to the reverse flag, and reverse the synchronous data stream to be reversed.

25. The MBBMS according to claim 24, wherein
the data memory is further configured to delete the synchronous data stream to be reversed, and determine whether the synchronous data stream to be reversed is deleted successfully;
the source platform is further configured to, if the data memory unsuccessfully deletes the synchronous data stream to be reversed, send the serial number corresponding to the synchronous data stream to be reversed and the reverse flag to the data buffer;
the data buffer is further configured to, if the data memory unsuccessfully deletes the synchronous data stream to be reversed, send the serial number corresponding to the synchronous data stream to be reversed and the reverse flag to the target platform; and
the target platform is further configured to, if the data memory unsuccessfully deletes the synchronous data stream to be reversed, search for the synchronous data stream to be reversed corresponding to the serial number according to the reverse flag, and reverse the synchronous data stream to be reversed.

26. The MBBMS according to claim 25, wherein
the target platform is further configured to determine whether there is a synchronous data stream to be reversed corresponding to the serial number in the temporary data module according to the reverse flag, and if there is no synchronous data stream to be reversed, extract the service data stored together with the serial number in the historical data module according to the serial number, and update the synchronous data stream to be reversed in the formal data module with the service data extracted; or if there is a synchronous data stream to be reversed, delete the synchronous data stream to be reversed in the temporary data module.

27. The MBBMS according to claim 26, wherein the source platform is a broadcasting and television platform and the target platform is a mobile service platform.

28. A device for transmitting data information, comprising: a data buffer and a data memory, wherein the data buffer and the data memory are the data buffer and the data memory according to claim 27.

29. A method for transmitting data information, comprising following steps of:
sending, by a source platform, a synchronous data stream to a data buffer;
determining, by the source platform, whether the synchronous data stream is sent to the data buffer successfully;
sending, by the data buffer, the synchronous data stream to a target platform if the synchronous data stream is sent to the data buffer successfully; and
sending, by the source platform, the synchronous data stream to a data memory for storing if the synchronous data stream is sent to the data buffer unsuccessfully;
wherein the synchronous data stream contains: service data to be synchronized, a serial number corresponding to the service data to be synchronized, and an effective flag, wherein the effective flag is an instant effective flag or a timing effective flag;
after the target platform receives the synchronous data stream, further comprising following steps of:
determining whether the synchronous data stream contains an instant effective flag or a timing effective flag;
if the synchronous data stream contains a timing effective flag, storing the service data to be synchronized and the serial number contained in the synchronous data stream in a temporary data module;
extracting the serial number in the temporary data module and service data to be updated in a formal data module, and storing the serial number and the service data to be updated in a historical data module;
extracting the service data to be synchronized in the temporary data module, and updating the service data to be updated in the formal data module with the service data to be synchronized; and
deleting the service data to be synchronized and the serial number in the temporary data module.

30. The method for transmitting data information according to claim 29, wherein the step of sending, by the data buffer, the synchronous data stream to a target platform if the synchronous data stream is sent to the data buffer successfully comprises:
sending, by the data buffer, the synchronous data stream to the target platform, and determining whether the synchronous data stream is sent successfully;
if the synchronous data stream is sent unsuccessfully, sending, by the data buffer, the synchronous data stream to the data memory for storing, then extracting the synchronous data stream from the data memory regularly according to a preset timing period parameter, and sending the synchronous data stream extracted regularly to the target platform until the data buffer sends the synchronous data stream extracted regularly to the target platform successfully; and
deleting, by the data memory, the synchronous data stream extracted regularly which has been sent successfully.

31. The method for transmitting data information according to claim 30, further comprising following steps of: after the target platform receives the synchronous data stream,
determining whether the synchronous data stream contains an instant effective flag or a timing effective flag;

if the synchronous data stream contains an instant effective flag, extracting the serial number in the synchronous data stream received and the service data to be updated in a formal data module, and storing the serial number together with the service data to be updated in a historical data module; and updating the service data to be updated in the formal data module with the service data to be synchronized in the synchronous data stream received.

32. The method for transmitting data information according to claim 31, further comprising:

determining, by the source platform, whether a synchronous data stream to be reversed is sent to the data buffer successfully;

if the synchronous data stream to be reversed is sent to the data buffer successfully, sending, by the source platform, a reverse flag and a serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed;

and if the synchronous data stream to be reversed is sent to the data buffer unsuccessfully, sending, by the source platform, the reverse flag and the serial number corresponding to the synchronous data stream to be reversed to the data memory; and searching for, by the data memory, the synchronous data stream to be reversed corresponding to the serial number according to the reverse flag, and reversing, by the data buffer, the synchronous data stream to be reversed.

33. The method for transmitting data information according to claim 32, wherein the step of reversing, by the data memory, the synchronous data stream to be reversed comprises:

deleting, by the data memory, the synchronous data stream to be reversed, and determining, by the data memory, whether the synchronous data stream to be reversed is deleted successfully;

if the synchronous data stream to be reversed is deleted unsuccessfully, sending, by the source platform, the reverse flag and the serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed.

34. The method for transmitting data information according to claim 33, wherein the step of searching for, by the target platform, the synchronous data stream to be reversed corresponding to the serial number according to the reverse flag, and reversing, by the target platform, the synchronous data stream to be reversed comprises:

determining, according to the reverse flag, whether there is a synchronous data stream to be reversed corresponding to the serial number in the temporary data module;

if there is no synchronous data stream to be reversed, extracting the service data stored together with the serial number in the historical data module according to the serial number;

updating the service data to be synchronized to be reversed in the formal data module with the service data extracted; and if there is a synchronous data stream to be reversed, deleting the synchronous data stream to be reversed in the temporary data module.

35. The method for transmitting data information according to claim 34, wherein the source platform is a broadcasting and television platform and the target platform is a mobile service platform.

36. The method for transmitting data information according to claim 29, further comprising: after the step of sending, by the source platform, the synchronous data stream to a data memory for storing if the synchronous data stream is sent to the data buffer unsuccessfully, extracting, by the data buffer, the synchronous data stream from the data memory regularly according to a preset timing period parameter;

sending, by the data buffer, the synchronous data stream extracted regularly to the target platform until the synchronous data stream extracted regularly is sent to the target platform successfully; and deleting, by the data memory, the synchronous data stream extracted regularly which has been sent successfully.

37. The method for transmitting data information according to claim 36, further comprising following steps of: after the target platform receives the synchronous data stream, determining whether the synchronous data stream contains an instant effective flag or a timing effective flag;

if the synchronous data stream contains an instant effective flag, extracting the serial number in the synchronous data stream received and the service data to be updated in a formal data module, and storing the serial number together with the service data to be updated in a historical data module; and updating the service data to be updated in the formal data module with the service data to be synchronized in the synchronous data stream received.

38. The method for transmitting data information according to claim 37, further comprising:

determining, by the source platform, whether a synchronous data stream to be reversed is sent to the data buffer successfully;

if the synchronous data stream to be reversed is sent to the data buffer successfully, sending, by the source platform, a reverse flag and a serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed;

and if the synchronous data stream to be reversed is sent to the data buffer unsuccessfully, sending, by the source platform, the reverse flag and the serial number corresponding to the synchronous data stream to be reversed to the data memory; and searching for, by the data memory, the synchronous data stream to be reversed corresponding to the serial number according to the reverse flag, and reversing, by the data buffer, the synchronous data stream to be reversed.

39. The method for transmitting data information according to claim 38, wherein the step of reversing, by the data memory, the synchronous data stream to be reversed comprises:

deleting, by the data memory, the synchronous data stream to be reversed, and determining, by the data memory, whether the synchronous data stream to be reversed is deleted successfully;

if the synchronous data stream to be reversed is deleted unsuccessfully, sending, by the source platform, the reverse flag and the serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed.

40. The method for transmitting data information according to claim 39, wherein the step of searching for, by the target platform, the synchronous data stream to be reversed corresponding to the serial number according to the reverse flag, and reversing, by the target platform, the synchronous data stream to be reversed comprises:

determining, according to the reverse flag, whether there is a synchronous data stream to be reversed corresponding to the serial number in the temporary data module;

if there is no synchronous data stream to be reversed, extracting the service data stored together with the serial number in the historical data module according to the serial number;

updating the service data to be synchronized to be reversed in the formal data module with the service data extracted; and if there is a synchronous data stream to be reversed, deleting the synchronous data stream to be reversed in the temporary data module.

41. The method for transmitting data information according to claim 40, wherein the source platform is a broadcasting and television platform and the target platform is a mobile service platform.

42. The method for transmitting data information according to claim 29, further comprising: after the step of sending, by the source platform, the synchronous data stream to a data memory for storing if the synchronous data stream is sent to the data buffer unsuccessfully, sending, by the source platform, a serial number corresponding to the synchronous data stream to be re-sent to the data buffer;

extracting, by the data buffer, the synchronous data stream to be re-sent from the data memory according to the serial number, and sending the synchronous data stream to be re-sent to the target platform; and deleting, by the data memory, the synchronous data stream to be re-sent which has been sent successfully.

43. The method for transmitting data information according to claim 42, further comprising following steps of: after the target platform receives the synchronous data stream, determining whether the synchronous data stream contains an instant effective flag or a timing effective flag;

if the synchronous data stream contains an instant effective flag, extracting the serial number in the synchronous data stream received and the service data to be updated in a formal data module, and storing the serial number together with the service data to be updated in a historical data module; and updating the service data to be updated in the formal data module with the service data to be synchronized in the synchronous data stream received.

44. The method for transmitting data information according to claim 43, further comprising:

determining, by the source platform, whether a synchronous data stream to be reversed is sent to the data buffer successfully;

if the synchronous data stream to be reversed is sent to the data buffer successfully, sending, by the source platform, a reverse flag and a serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed;

and if the synchronous data stream to be reversed is sent to the data buffer unsuccessfully, sending, by the source platform, the reverse flag and the serial number corresponding to the synchronous data stream to be reversed to the data memory; and searching for, by the data memory, the synchronous data stream to be reversed corresponding to the serial number according to the reverse flag, and reversing, by the data buffer, the synchronous data stream to be reversed.

45. The method for transmitting data information according to claim 44, wherein the step of reversing, by the data memory, the synchronous data stream to be reversed comprises:

deleting, by the data memory, the synchronous data stream to be reversed, and determining, by the data memory, whether the synchronous data stream to be reversed is deleted successfully;

if the synchronous data stream to be reversed is deleted unsuccessfully, sending, by the source platform, the reverse flag and the serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed.

46. The method for transmitting data information according to claim 45, wherein the step of searching for, by the target platform, the synchronous data stream to be reversed corresponding to the serial number according to the reverse flag, and reversing, by the target platform, the synchronous data stream to be reversed comprises:

determining, according to the reverse flag, whether there is a synchronous data stream to be reversed corresponding to the serial number in the temporary data module;

if there is no synchronous data stream to be reversed, extracting the service data stored together with the serial number in the historical data module according to the serial number;

updating the service data to be synchronized to be reversed in the formal data module with the service data extracted; and if there is a synchronous data stream to be reversed, deleting the synchronous data stream to be reversed in the temporary data module.

47. The method for transmitting data information according to claim 46, wherein the source platform is a broadcasting and television platform and the target platform is a mobile service platform.

48. The method for transmitting data information according to claim 29, further comprising following steps of: after the target platform receives the synchronous data stream, determining whether the synchronous data stream contains an instant effective flag or a timing effective flag;

if the synchronous data stream contains an instant effective flag, extracting the serial number in the synchronous data stream received and the service data to be updated in a formal data module, and storing the serial number together with the service data to be updated in the historical data module; and updating the service data to be updated in a formal data module with the service data to be synchronized in the synchronous data stream received.

49. The method for transmitting data information according to claim 48, further comprising:

determining, by the source platform, whether a synchronous data stream to be reversed is sent to the data buffer successfully;

if the synchronous data stream to be reversed is sent to the data buffer successfully, sending, by the source platform, a reverse flag and a serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed;

and if the synchronous data stream to be reversed is sent to the data buffer unsuccessfully, sending, by the source platform, the reverse flag and the serial number corresponding to the synchronous data stream to be reversed to the data memory; and searching for, by the data memory, the synchronous data stream to be reversed corresponding to the serial number according to the reverse flag, and reversing, by the data buffer, the synchronous data stream to be reversed.

50. The method for transmitting data information according to claim 49, wherein the step of reversing, by the data memory, the synchronous data stream to be reversed comprises:

deleting, by the data memory, the synchronous data stream to be reversed, and determining, by the data memory, whether the synchronous data stream to be reversed is deleted successfully;

if the synchronous data stream to be reversed is deleted unsuccessfully, sending, by the source platform, the reverse flag and the serial number corresponding to the synchronous data stream to be reversed to the data buffer;

sending, by the data buffer, the reverse flag and the serial number corresponding to the synchronous data stream to be reversed to the target platform; and searching for, by the target platform, the synchronous data stream to be reversed corresponding to the serial number according to the reverse flag, and reversing, by the target platform, the synchronous data stream to be reversed.

51. The method for transmitting data information according to claim 50, wherein the step of searching for, by the target platform, the synchronous data stream to be reversed corresponding to the serial number according to the reverse flag, and reversing, by the target platform, the synchronous data stream to be reversed comprises:

determining, according to the reverse flag, whether there is a synchronous data stream to be reversed corresponding to the serial number in the temporary data module;

if there is no synchronous data stream to be reversed, extracting the service data stored together with the serial number in the historical data module according to the serial number;

updating the service data to be synchronized to be reversed in the formal data module with the service data extracted; and if there is a synchronous data stream to be reversed, deleting the synchronous data stream to be reversed in the temporary data module.

52. The method for transmitting data information according to claim 51, wherein the source platform is a broadcasting and television platform and the target platform is a mobile service platform.

* * * * *